United States Patent Office 3,453,020
Patented July 1, 1969

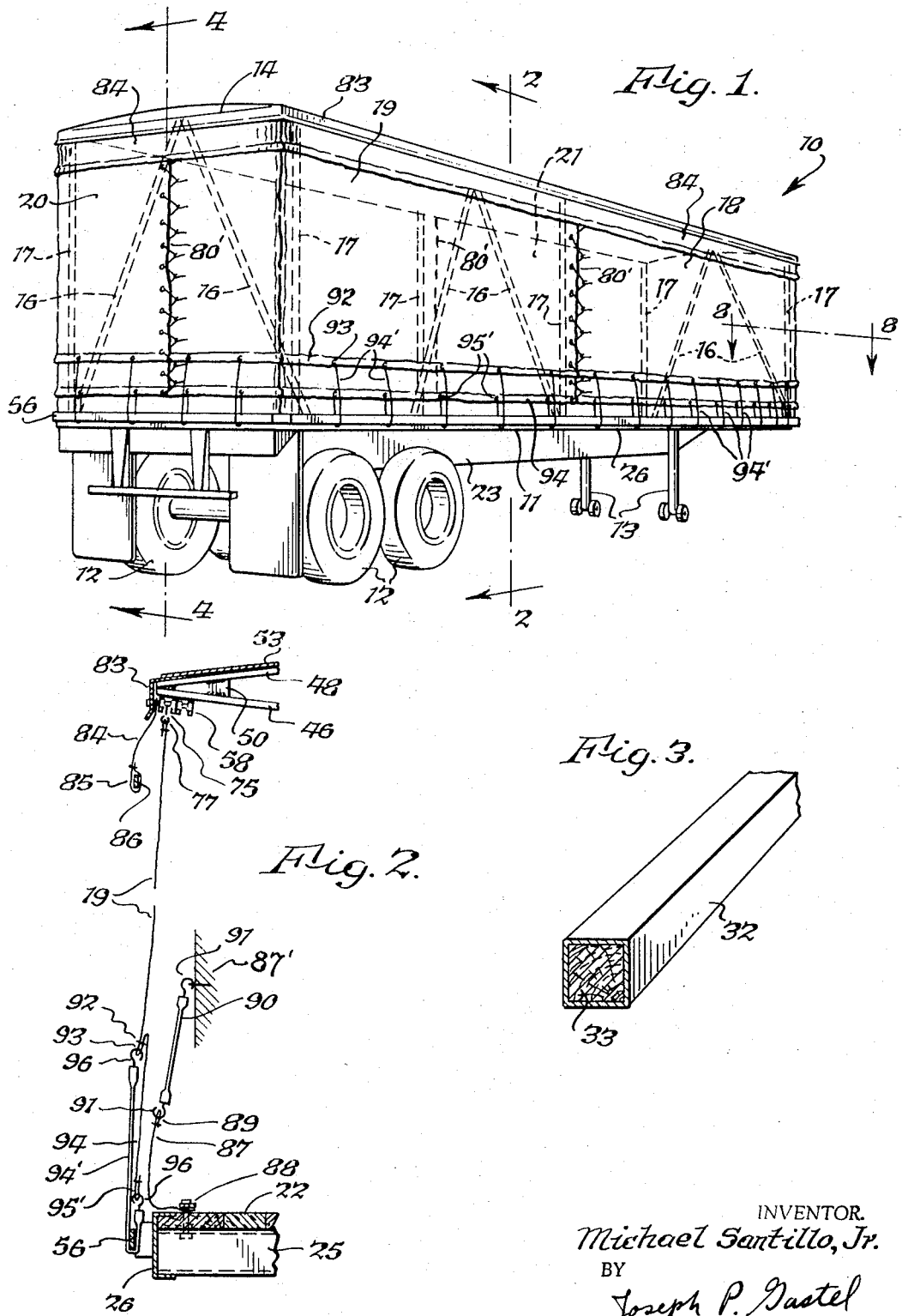

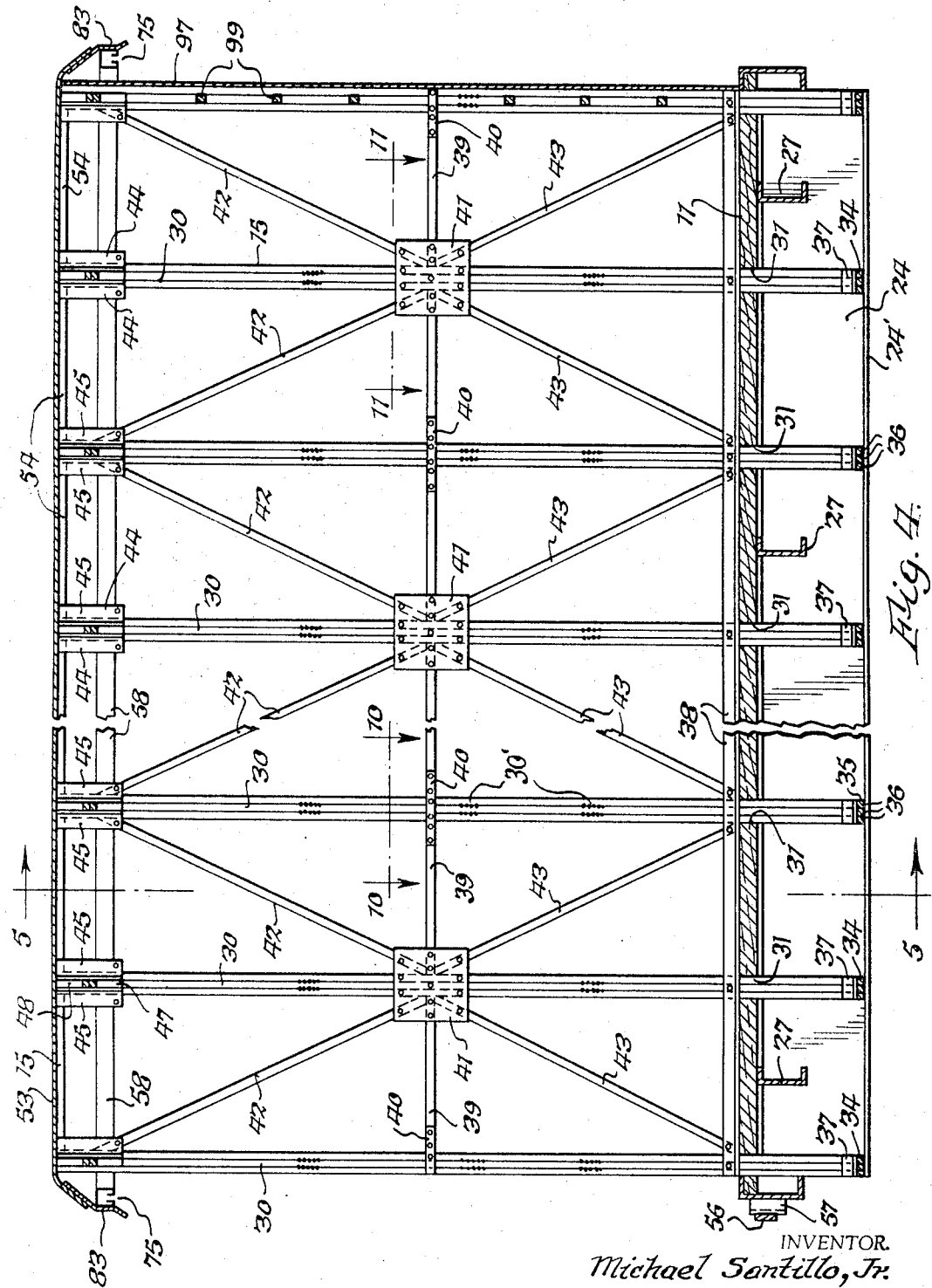

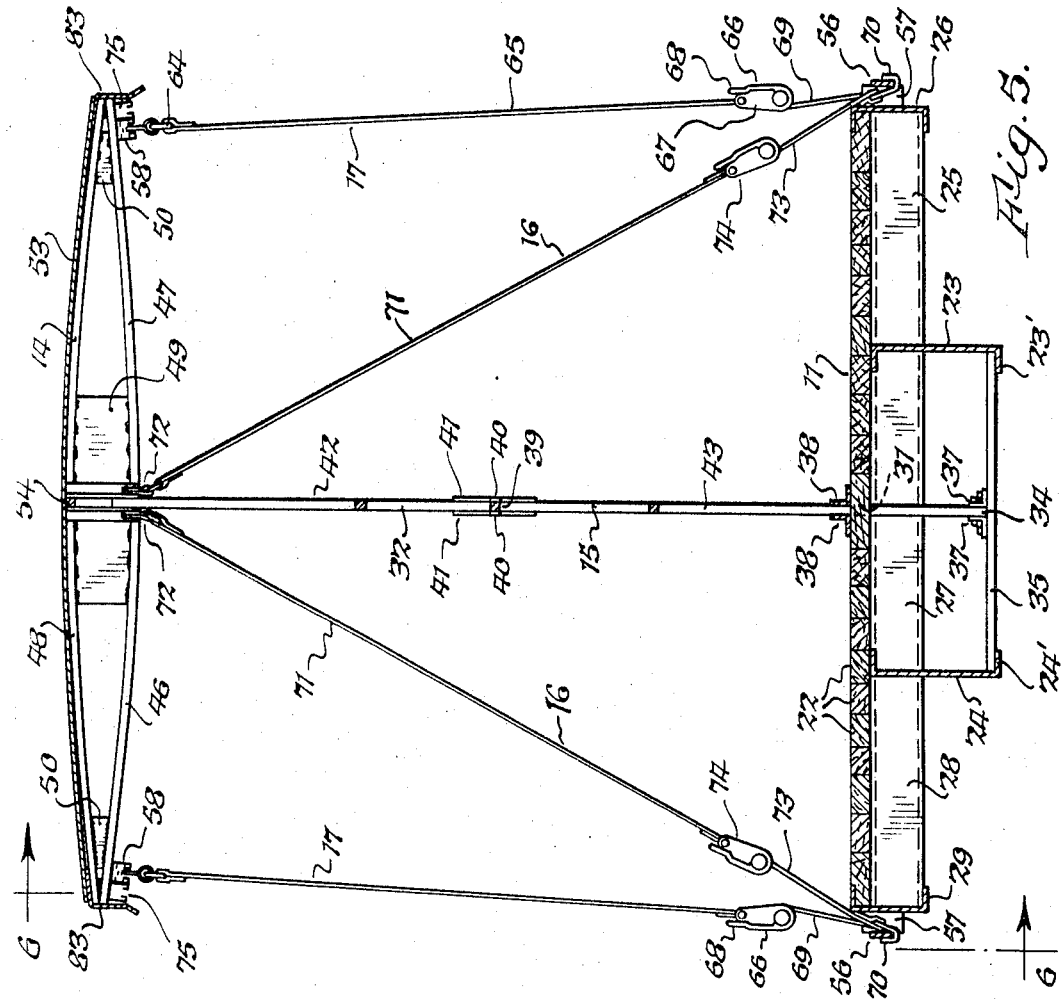
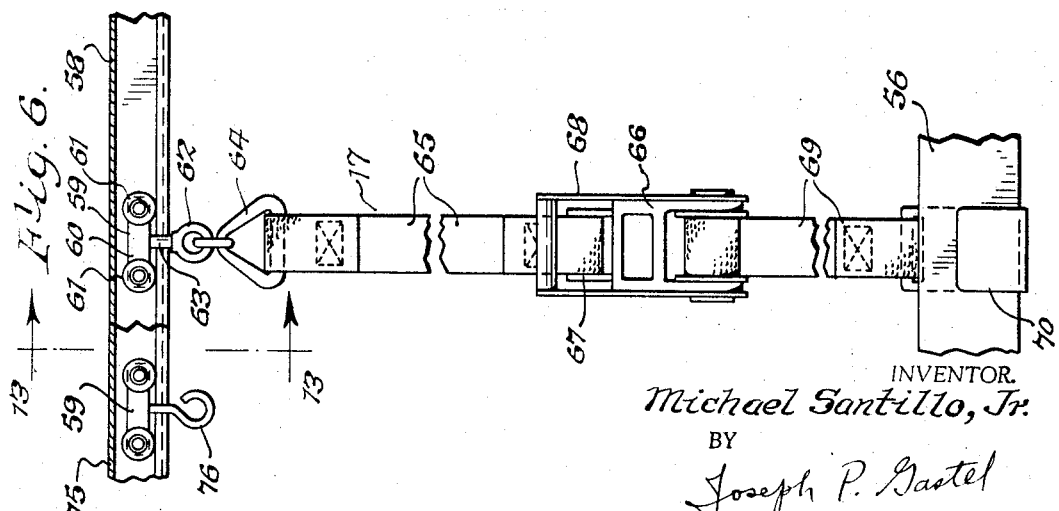

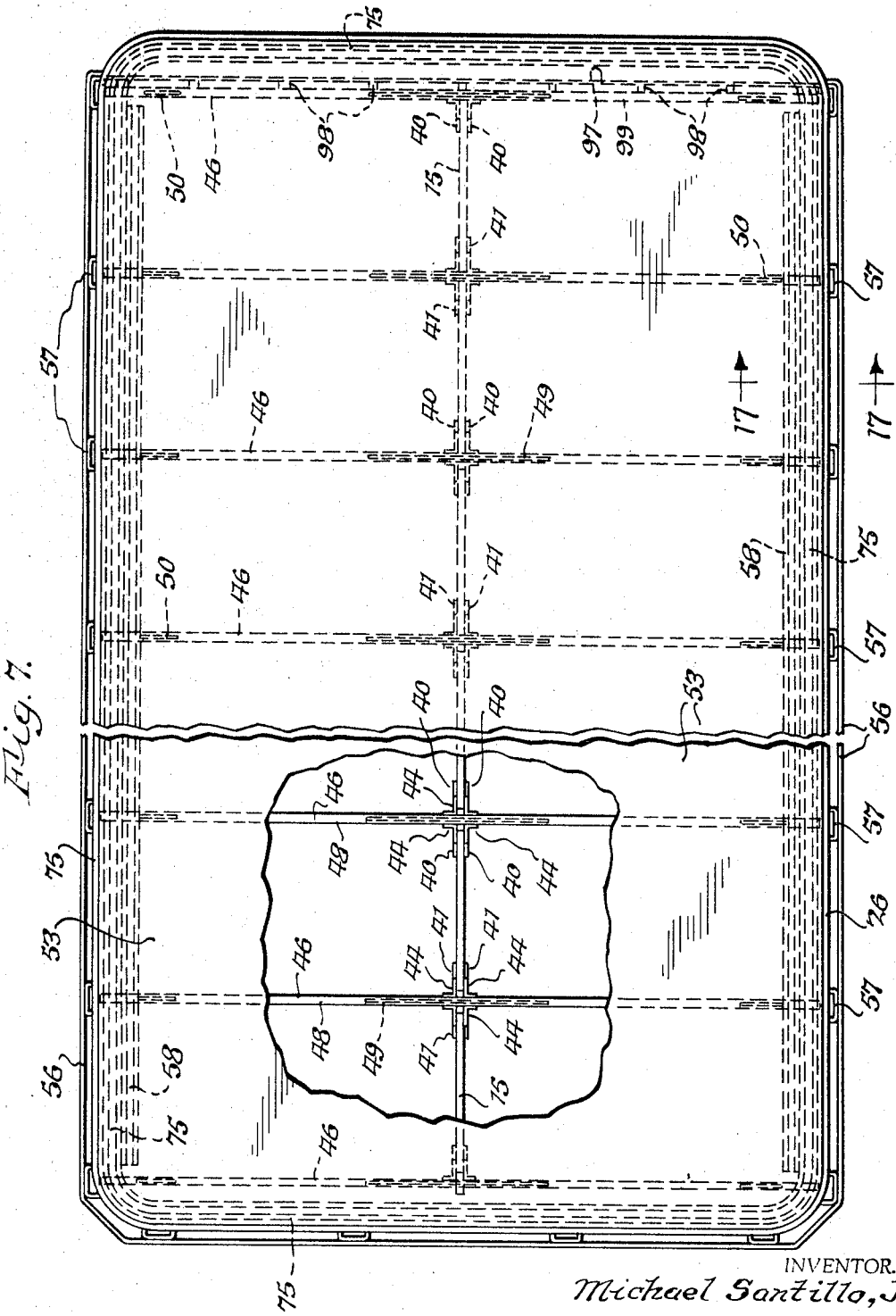

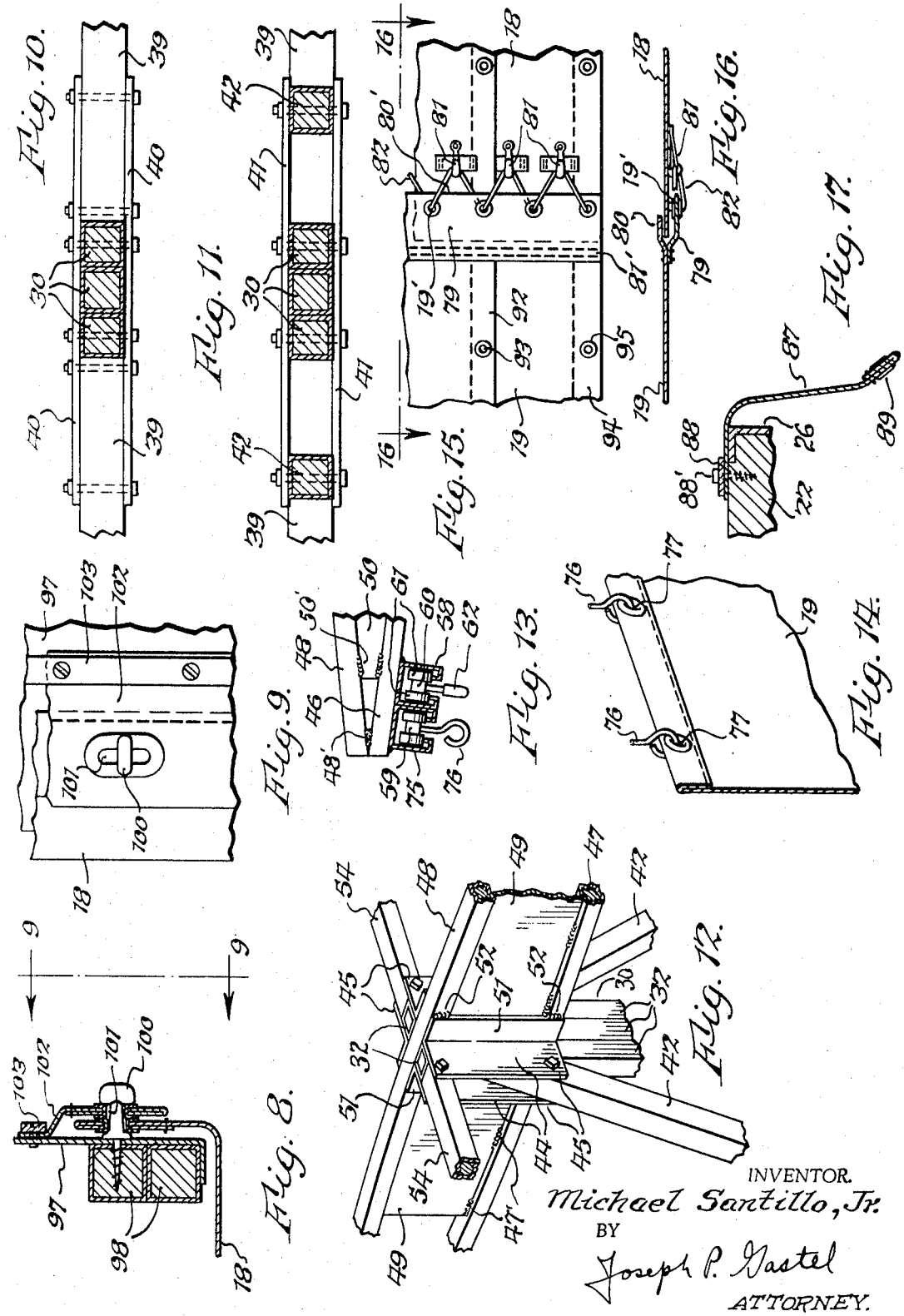

3,453,020
SIDE LOADING TRUCK
Michael Santillo, Jr., 675 Hopkins Road,
Williamsville, N.Y. 14221
Filed May 8, 1967, Ser. No. 636,840
Int. Cl. B60p 7/02
U.S. Cl. 296—100                    19 Claims

ABSTRACT OF THE DISCLOSURE

A side loading truck body including an elongated section consisting of connected columns extending centrally of a truck bed for supporting a permanent roof, thereby leaving the truck side unobstructed for side loading, and collapsible wall means suspended from the edge of the roof for selectively enclosing the truck body, and flexible tie members extending between the bed and the roof for bracing the roof.

Background of the invention

The present invention relates to an improved truck construction and more particularly to one which is manifestly suitable for side loading of cargo.

In recent years there has been a trend toward palletized cargo handling which requires that containers be loaded by machinery such as lift trucks or the like. It is extremely inconvenient to load conventional trucks in this manner inasmuch as conventional trucks have permanent sides which require the lift trucks to drive into the truck body. This is obviously an awkward procedure. In addition, the cargo has to be loaded in accurately planned sequence so that it may be unloaded with a minimum of effort when partial unloading is to be effected at various locations. In order to overcome the shortcomings of trucks with permanent bodies, an attempt has been made to use flat beds for palletized cargo handling. However, this has also been a difficult, awkward and inefficient way of handling cargo. In this respect, the cargo has to be protected against the elements, and in the past, tarpaulins have been used to cover the cargo once it has been loaded and secured. This has required a great effort and was also quite time-consuming in that it was necessary to untie the tarpaulin, roll it back before removing a part of a cargo, and thereafter place it back into position over the remainder of the cargo. Furthermore, tarpaulins of this type became worn and perforated with use and many times permitted water to leak onto the cargo. It is with the overcoming of the foregoing shortcomings of prior types of cargo-handling vehicles which were used for palletized loading that the present invention is concerned.

Summary of the invention

It is accordingly the primary object of the present invention to provide an improved vehicle onto which palletized cargo can be easily and efficiently loaded and unloaded and conveniently secured against exposure to the weather.

A further object of the present invention is to provide an improved side loading truck body having a permanent roof, thereby obviating the necessity for using tarpaulins of the prior types of trucks. A related object of the present invention is to provide an improved side loading truck body having a centrally supported room in which the supports occupy very little floor space on the truck bed, thereby leaving the bed free for mounting of cargo. A further related object of the present invention is to provide an improved truck body having collapsible side walls suspended from the roof which can be easily and quickly moved into position for enclosing the cargo against the elements, or exposing the cargo for unloading.

Yet another object of the present invention is to provide an improved truck body having a center-supported roof and including flexible tie members for selectively reinforcing the roof at spaced locations, as required, said tie members being shiftable so as not to interfere with loading and unloading. Other objects and attendant advantages of the present invention will readily be perceived hereafter.

The improved side loading truck body of the present invention includes a substantially horizontal truck bed having a central portion bounded by a perimeter and vertical roof supporting means extending upwardly from the central portion within the confines of said perimeter to thereby leave the side edges of the truck bed substantially unobstructed to permit side loading of cargo onto the truck bed, means for firmly mounting the lower portions of the roof-supporting means on the truck bed, means for mounting a permanent roof on the upper portions of the roof-supporting means, and foldable wall means suspended by the roof for selectively enclosing a cargo on said truck while being openable in an extremely simple manner to expose the cargo for unloading as required. In addition, flexible tie members are provided for selectively regidizing the roof and roof-supporting section against movement while the truck is in transit, said tie members being removable from their supporting positions so as not to interfere with loading and unloading. The present invention will be more fully understood when the following portions of the specification are read in conjunction with the accompanying drawings wherein:

Brief description of the drawings

FIGURE 1 is a perspective view of an improved truck body fabricated in accordance with the present invention;

FIGURE 2 is a fragmentary, partly schematic, cross sectional view taken substantially along line 2—2 of FIGURE 1;

FIGURE 3 is a fragmentary cross sectional view of the structural members which are used for fabricating the various sections mounted on the truck bed;

FIGURE 4 is a cross sectional view taken substantially along line 4—4 of FIGURE 1 and showing the construction of the roof-supporting section;

FIGURE 5 is a fragmentary view, partially in cross section, taken substantially along line 5—5 of FIGURE 4 and showing the manner in which the roof-supporting section is mounted on the bed of the vehicle, the bow trusses for the roof, and the tie members which are used to rigidize the roof;

FIGURE 6 is a fragmentary view taken substantially along line 6—6 of FIGURE 5 and showing the manner in which certain of the tie members are mounted and also showing the hanger for the collapsible wall;

FIGURE 7 is a plan view of the roof, partially broken away, showing the orientation of various elements relative thereto;

FIGURE 8 is a view taken substantially along line 8—8 of FIGURE 1 and showing the arrangement for securing the front end of the collapsible wall panel against entry of rain into the vehicle;

FIGURE 9 is a fragmentary view taken substantially in the direction of arrows 9—9 of FIGURE 8;

FIGURE 10 is a view partially in cross section taken substantially along line 10—10 of FIGURE 4 and showing the manner of joining certain cross braces to the upright columns;

FIGURE 11 is a view taken substantially along line 11—11 of FIGURE 4 and showing the manner of joining other of the cross braces to certain of the columns;

FIGURE 12 is a fragmentary perspective view of the joint between the top of the roof-supporting columns and the roof-supporting trusses;

FIGURE 13 is an enlarged detail view showing the manner in which the various tracks are mounted on the roof trusses;

FIGURE 14 is a fragmentary perspective view showing the manner in which the collapsible wall panels are hung from the roof;

FIGURE 15 is an enlarged side elevational view showing the manner in which sections of collapsible wall panels are joined to each other to weatherproof the cargo;

FIGURE 16 is a view partially in cross section taken substantially along line 16—16 of FIGURE 15; and FIGURE 17 is a fragmentary view partially in cross section taken substantially along line 17—17 of FIGURE 7 and showing the manner in which the bottom protective flap is mounted along the edge of the bed of the truck.

*Description of the preferred embodiments*

The improved truck body 10 of the present invention is shown in FIGURE 1 and comprises a trailer which is to be drawn by an automotive tractor. However, it will be appreciated that the principles of the present invention may be incorporated into any type of truck or flat bed vehicle. Broadly, the improved truck body 10 of the present invention includes a truck bed 11 which is suitably mounted on rear wheels 12 and includes a pair of parking wheel assemblies 13. A permanent roof 14 is supported at the top of roof-supporting section 15 which extends longitudinally of the truck bed 11 and has its lower portion suitably secured to the truck bed. A plurality of flexible tie members 16 and 17 are positioned at longitudinally spaced locations along the axis of the truck for stabilizing roof-supporting sections 15 and roof 14. In addition, collapsible side wall panels 18, 19, 20 and 21 selectively enclose the truck to protect the cargo against the elements, but are openable in an extremely simple manner to provide ease of access to the truck bed for loading and unloading.

The truck bed 11 (FIGS. 4 and 5) includes a wooden floor which may consist of planks 22 running longitudinally of the bed. Underlying planks 22 and extending longitudinally throughout the length of the bed are channels 23 and 24. Extending outwardly to the right of channel 23, FIGURE 5, are spaced cross channels 25. The left ends of these channels are suitably secured, as by welding, to channel 23 and the right ends of these channels are received within the legs of channels 26 which brackets channels 25 and the outermost of the planks 22. Running between channels 23 and 24 with the opposite ends thereof welded thereto are channels 27 which are spaced longitudinally of the bed 11. Channels 28 are spaced longitudinally of bed 11 and have their right ends (FIGURE 5) secured, as by welding, to channel 24 and their left ends carried by channel 29 which runs longitudinally of the truck bed. Channels 25, 27 and 28 are spaced along the longitudinal axis of the bed, and thereby act as beams to support the planks 22.

A roof 14, which is permanent, is suspended above truck bed 11 by roof-supporting section 15, which leaves the sides of the truck unobstructed to enhance ease of loading and unloading. As can be seen from FIGURES 5 and 7, roof-supporting section 15 occupies very little floor space, thereby leaving more payload area. Roof-supporting section 15 consists of a plurality of longitudinally spaced columns 30, FIG. 4, which extend through longitudinally spaced apertures 31, FIG. 5, in bed 11. As can be seen from FIGURE 5, section 15 is located on the longitudinal axis of the truck bed. Each column 30 of section 15 consists of three square metal tubes 32, FIG. 3, which have been welded to each other, as at 30', in the position shown. Driven by a wedge fit into each section 32 is oak timber 33 which reinforces section 32 against fatigue. All structural members which form the roof trusses, to be described hereafter, and other supports, links and braces, are made in the same manner, namely, with a metal sheath and a wooden core.

An arrangement is provided for rigidly supporting the lower end 32 of each column. In this respect, the lower end 34 of each column 30 rests on cross brace 35 (FIG. 5), the opposite ends of which are attached, as by welding, to the legs 23' and 24' of channels 23 and 24, respectively, and rest on such legs and are secured, as by welding, to the web portions of these channels. Each cross brace 35 consists of three wood-filled square tubular metal sheaths 36 laid side-by-side and welded to each other. The bottom portion 34 of each column 30 rests on cross brace 35 and is secured thereto by suitable fasteners, not numbered, passing through angles 37. These fasteners have been omitted from certain of the drawings in the interest of clarity. In addition, it is to be noted that angles 38, FIGS. 4 and 5, run longitudinally throughout the length of bed 11 and are located on opposite sides of columns 30. Angles 38 are suitably secured to both columns 30 and the appropriate planks 22 by suitable fasteners, such as bolts, not numbered. It can thus be seen that columns 30 are anchored firmly to bed 11 by virtue of passing through close apertures 31 and being supported in the above described manner by angles 37 and 38 at spaced locations, and by being attached to cross braces 35.

To further brace roof-supporting section 15, it can be seen from FIGURE 4 that horizontal links 39 extend between columns 30 at approximately their midpoints. Links 39 are attached to each other and to columns 30 by elongated opposed metal straps 40, FIGS. 4 and 10, which occupy the position shown. The bolts have not been numbered in the interest of simplicity. The opposite ends of each of adjacent cross links 39 are secured to alternate columns 30 by opposed plates 41, FIGS. 4 and 11, which are secured to columns 30 and to said links 39 by suitable bolts, not numbered. In addition, plates 41 serve as an anchor for diagonal braces 42 and 43. At this point it is to be noted that the lower ends of brace members 43 are secured between angles 38, as can be seen from FIGURE 4, and the upper ends of lower braces 43 are secured by suitable bolts between plates 41. The lower ends of braces 42 are secured between plates 41 (FIG. 11) and the upper ends are received between the legs 45 of angles 44 and held therein by suitable bolts, not numbered. Legs 45 of angles 44 are secured by suitable bolts, not shown, to the outer two members 32 of each column, each of the bolts extending through opposed legs 45 of the angles on the opposite sides of the column, as shown in FIG. 11. The center member 32 of each column stops short of the roofbow 46, as will be explained hereafter.

The roof 14 is centrally supported on the tops of columns 30. The roof consists of a plurality of spaced roof bow trusses 46, one mounted on the top of each column 30. Each roof bow truss (FIGS. 5 and 12) consists of a lower chord 47 and an upper cord 48 having opposite ends which are suitably attached to each other as by welding 48' (FIG. 13). Chords 47 and 48 are continuous throughout their respective lengths. The central portions are held in spaced relationship by a spacer plate 49 which is a steel plate of sufficient rigidity, which is welded to chords 47 and 48 at locations such as 47'. Small end plates 50 are located proximate the ends of truss 46 and the members 47 and 48 are welded to opposite sides thereof, as by 50' (FIG. 13). As can be seen from FIGURE 12, the legs 51 of angles 44 are welded to members 47 and 48 at 52. Sheet metal 53 is suitably secured to members 48 to provide a leakproof roof. Reinforcing links 54 (FIGS. 4 and 12) extend between adjacent bow members 48 and are received between adjacent angle legs 45 and are bolted thereto as shown in FIGURE 12. As can be seen from FIG. 12, the two outer members 32 of each column 30 extend to the top of member 48. The center member 32 of each column abuts the underside of chord 47. Because of the foregoing construction the roof 14 is supported rigidly from the bed 11 of the truck solely by means of thin roof-supporting section 15. In this respect it is to be noted that tubular members 32 which form the columns are 1⅛ inches wide and thus the foregoing construction takes up very little floor space while rigidly supporting the roof trusses 46 in the above described manner. Since the sides of the truck are totally unobstructed, it will be appreciated that side loading can be effected with great ease, and access can be had to any part of the load for partial unloading.

It will be appreciated that the roof 14 and the roof-supporting section 15 have to be supported additionally against excessive swaying when the truck is in motion, especially when it is traveling in an unloaded condition. Therefore tie members 16 and 17 are provided at select spaced locations, as can be seen from FIGURES 1 and 5. As can be seen from FIGURES 1, 5 and 7, a rail 56 is secured to channels 26 and 29, which form the sides of bed 11, by a plurality of spaced channel sections 57. Rail 56 extends around the sides and rear of the bed, as shown in FIG. 7. Tracks 58 (FIGS. 7, 5 and 13) are attached to opposite ends of the undersides of bow members 47, as by welding. Tracks 58 extend only from front to rear on each side of the vehicle, as shown in FIGURE 7. They do not extend across the front or the rear. A plurality of roller carriage assemblies 59 are mounted for movement within each track 58, each assembly consisting of a body portion 60 and spaced wheels 61 at opposite ends and on opposite sides of the body portion (FIGS. 6 and 13). An eye member 62 is attached by link 63 to body 60. Eye 62 has a delta-shaped belt mounting ring 64 which carries a web belt portion 65 having its other end mounted on a ratchet buckle 66 consisting of a body portion 67 and a handle 68. Another belt portion 69 has one end suitably mounted on ratchet buckle 66 and its other end permanently secured to hook 70 (FIGS. 5 and 6) which is essentially a J-shaped member. Hook 70 slips into engagement with rail 56, as can be seen from FIGURES 5 and 6. Insofar as pertinent here, the ratchet buckle serves to take up the slack between web portions 65 and 69 by merely manipulating handle 68 back and forth to tighten up the slack, and an automatic ratchet mechanism holds the belt in its tightened position until it is released by a suitable release mechanism. Ratchet buckles of this type per se do not form any specific aspect of the present invention and therefore will not be described in detail. However, it is to be noted that ratchet buckles which have been used successfully are fully shown and explained in Catalog No. 352 of the Aeroquip Corporation pp. 18 and 19, copyrighted 1964. As can be seen from FIGURES 1 and 5, tie assemblies 17 can be located at any desired longitudinally spaced locations on the truck body and the tightening of these tie assemblies by manipulating the ratchet buckles will provide support for the opposite sides of the roof 14. It is to be especially noted however that when ratchet buckles 66 are loosened and hooks 70 detached from rail 56, the roller construction 59 will permit the tie members 17 to be moved to an out-of-the-way location so as not to interfere with the side loading of the truck. Thereafter tie membere 17 are moved to any suitable location to rigidly secure the opposite sides of roof 14 against excessive movement.

In addition, tie members 16 are also provided at select spaced locations for the purpose of bracing roof-supporting section 15 against swinging movement when the truck is in transit. I this respect, tie members 16 include upper web portions 71 (FIG. 5) which have their upper ends anchored to brackets 72 which are in turn permanently attached to angles 44 by means of suitable bolts. Tie members 16 also include lower web portions 73 which are anchored to ratchet buckles 74 and have J-shaped hooks such as 70 permanently attached to the lower ends of web portions 73. Hooks 70 also are to be selectively hooked onto rail 56. It will be appreciated that when ratchet buckles 74, which are identical to ratchet buckles 67, are tightened, the slack in tie members 16 will be taken up and these tie members will therefore reinforce the wall supporting section 15 against excessive movement. As can be sen from FIGURE 1, tie members 16 are spaced longitudinally along the track at select spaced locations. It will be appreciated that if it is desired to temporarily release tie members 16, it is merely necessary to release ratchet buckles 74 and unhook the hooks at the lower portions of tie members 16 from the rail and place the tie members in an out-of-the-way position where they do not interfere with the loading or unloading of the cargo. Generally tie members 16 will not be used when the truck is loaded because the cargo will abut opposite sides of roof-supporting section 15 and thus brace this section because the cargo will be tied down by ropes which extend across the cargo and are anchored to the side rail 56. The fact that the roof-supporting section 15 is open, permits ropes to be thrown from one side of the truck to the other. However, if only a partial load is being carried, the tie members 16 will be used. Or, they may be used by passing over the cargo and tightened in which case they would not assume the straight line condition shown in FIGURES 1 and 5. It will be appreciated that tie members 16 and 17 can be mounted at any desired location along the length of the truck.

To secure and protect the contents of the truck against the weather, collapsible side panel sections 18, 19, 20 and 21 are provided. Each of these sections consists of a canvas sheet which is suspended from continuous track 75, which runs outside of tracks 58 along the sides of roof 14, and also runs around the rear and the front of the truck (FIG. 7). Track 75 mounts a plurality of roller assemblies 59 which are identical to roller assemblies 59 described in detail above (FIGS. 6 and 13). Each of these roller assemblies includes a hook 76 which depends from the body portion of the roller assembly. Apertures which are reinforced by eyelets 77, or the like, in the top edge of canvas 19 (FIG. 14) receive the hooks of spaced rollers 59. For example, the holes and eyelets 77 may be spaced about a foot apart, so as to provide good support for canvas 19. It can readily be visualized that panels 18, 19, 20 and 21 are thus suspended in the manner of drapes from roller assemblies 59.

Adjacent sections such as 18–19, 19–20 and 20–21 are joined by lap joint 80' to prevent water from reaching the cargo. As can be seen from FIGURE 15, the construction 80' for effecting this joining includes a plurality of eyelets 19' in flap 79 overlying flap 80, both of said flaps being attached to panel 19 by seam 81'. A plurality of spaced snap hooks 81, which can be opened and closed, are mounted on adjacent panel 18. A rope 82, which extends through spaced eyelets 19', is laced through hooks 81. The lower ends of the rope 82 is thereafter tied to rail 56. As can be seen from the drawing, a lap joint 80' of the type described above exists at the juncture of panels 18 and 19. An identical lap joint 80' also exists at the juncture of panels 19 and 20, and also at the juncture of panels 20 and 21. In order to unlace joint 80', it is merely necessary to open hooks 81, as by depressing a band spring which closes them, to thereby permit rope 82 to be withdrawn from each of the hooks. As can be seen from FIGURE 16, the edge of panel 18 forms a lap joint with flaps 79 and 80.

In order to further seal the contents of the trailer against the elements, a metal flashing 83 has its upper edge underlying the edge of roof 53 (FIG. 5) and its lower portion extending laterally of rail 75. A canvas skirt 84 has its upper portion secured as by rivets to the lower portion of flashing 83. Skirt 84 extends around the four sides of the trailer. Skirt 84 includes a hem 85 which carries a metal rod 86 around its entire periphery (FIG. 2). This rod rigidizes the skirt so that it will not be blown up by the wind while the truck is in transit. As can be seen from FIGURES 1 and 2, skirt 84 overlies the upper portions of all of the collapsible wall panels and therefore acts as a weather seal.

In order to complete the sealing, a flap 87 (FIGS. 2 and 17) is provided which is elongated in the same manner as flap 84, and runs generally parallel thereto. Flap 87 extends along the entire two sides and rear edge of the bed 11. This flap has one edge secured permanently to floor members 22 by spaced bolts 88' which extend through mouding 88. The upper edge of flap 87 includes spaced eyelets 89. Fastening members which comprise an elastic central portion 90 having hooks 91 at opposite ends thereof are used to hold flap 87 in the sealing position shown in FIG. 2. More specifically, one hook 91 is threaded through an eyelet 89 and the other hook 91 at the opposite end of elastic 90 is fastened to any suitable portion of the load 87'. This is repeated at spaced locations. This causes flap 87 to provide a wraparound seal for the bottom of the cargo to thereby prevent liquids from splashing up to contact the cargo, especially considering that the lower portion of the collapsible wall panel 19 covers flap 87. FIGURE 17 shows flap 87, which is made out of canvas, in the position in which it is placed during loading of cargo.

As can be seen from FIGURES 1 and 2, the lower portions of wall panels 18, 19, 20 and 21 includes structure for securing them to prevent liquids from reaching the cargo. All of the structure on each of these are identical and therefore only that associated with panel 19 will be described. More specifically, panel 19 includes an elongated tab 92 (FIGS. 1, 2 and 15) having a plurality of spaced eyelets 93. Tab 92 is produced by bending a portion of panel 19 back on itself and running a seam along the fold, as can be visualized from FIGS. 2 and 15. In addition, panel 19 also includes a hem 94 having spaced eyelets 95. To hold collapsible wall 19 taut, a plurality of elastic hook members 94' are provided with a central elastic portions 95 and hooks 96 at the ends thereof. The upper hook fits through an eyelet 93 in tab 92. Thereafter the elastic member is threaded through the space between rail 56 and channel 26, as shown, and the other hook 96 is threaded into eyelet 95 in hem 94. By the use of a plurality of members 94', as shown in FIGURE 1, the bottom of panel 19 can be secured to seal the cargo against rain. As can be seen from FIGURE 1, each of the panels 18, 19, 20 and 21 contain identical structure to secure their bottom portions in liquid-tight relationship relative to bed 11.

As noted above, there are four collapsible wall panels 18, 19, 20 and 21, with panels 18 and 19 being detachably joined by lap joint 80', described in detail above, walls 19 and 20 being joined by lap joint 80' and walls 20 and 21 being joined by a lap joint such as 80'. The purpose for using a plurality of panels connected by lap joints 80' is to permit selective access to various portions of the truck. More specifically, suppose the portion of the cargo to be unloaded is behind panel 18. Therefore, in order to reach this portion of the cargo, it is merely necessary to unlace lap joint 80' at the junction of walls 18 and 19 and also loosen the attachment members 94' associated with wall 18. Thereafter, panel 18 is manipulated, in the manner of a shower curtain or drape, to move it by means of its suspending roller carriage 59 toward the front of the truck and if desired it can be moved around onto the track portion 75 which is at the front of the truck so that it completely moves out of the way and exposes the side which it previously covered. If access is to be had to the portion of the cargo behind panel 19, the lap joint 80' between panels 18 and 19 is undone and the members 94' associated with wall 19 are detached. Thereafter panel 19 is slid from its portion adjacent panel 18 toward the rear of the truck so that it rides into the track portion 75 at the end of the truck, thereby completely exposing the side which it formerly covered. It can readily be seen that an analogous procedure can be used to uncover the other side of the truck by an analogous manipulation of the walls 20 and 21. If for any reason it is desired to completely expose both sides of the truck, then panels 18 and 21 are moved into the track portion 75 at the front of the truck overlying front panel 97 (FIG. 4) and panels 19 and 20 are moved to the rear of the truck into the track portion located at the rear end of the truck. It will be appreciated when the panels are collapsed that they will hang essentially like draperies. It is to be noted that panels 18 and 21 extend from the edge of the front 97 to about the middle of the truck, and panels 19 and 20 extend from the middle of the truck to the middle of the rear, as shown in FIG. 1.

At this point it is to be noted that the front of the trailer includes a grid work of structural bars such as shown in FIGURES 4 and 7, including vertical members 98 and horizontal members 99 connecting them. This grid work is covered by a metal panel 97.

The front edges of collapsible walls or panels 18 and 21 are secured to wall 97 by a plurality of button fasteners (FIGS. 8 and 9). In this respect, button fasteners 100 are spacedly mounted in a vertical row along the opposite edges of front wall 97. As can be seen from FIGURE 8, the button fasteners are received in the vertical bar 98 which runs along the edge of front panel 97. A row of vertical holes 101 are formed in the edge of collapsible panel 18. These are placed over buttons 100. Flap 102 has its one side secured to wall 97 by molding 103 and its loose end extending rearwardly, that is, toward the side of wall 97. Flap 102 also has spaced holes therein which mount onto buttons 100. Thereafter, the button fasteners 100 are twisted to secure the front edges of side panel 18 to wall 97 with a lap joint which will not permit water to pass therethrough. It can readily be seen that the front edges of panels 18 and 21 can thus be selectively detached from front panel 97 to permit said panels 18 and 21 to be moved into the track portion 75 which lies along the front edge of the truck.

While preferred embodiments of the present invention have been disclosed, it will be appreciated that it is not limited thereto but may be otherwise embodied within the scope of the following claims.

I claim:
1. A side loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, wall panel means, means for suspending said wall panel means from said roof for selectively enclosing said bed, said roof including second side edges, and said means for suspending said wall panel means from said roof for selectively enclosing said bed including track means mounted substantially along at least one of said second side edges, and carriage means in said track means for carrying said wall panel means.

2. A side loading truck body as set forth in claim 1 including means for anchoring said wall panel means relative to at least one of said side edges of said bed.

3. A side loading truck body as set forth in claim 1 wherein said wall panel means comprises a plurality of sheet-like panels, and means for selectively joining adjacent panels.

4. A side loading truck body as set forth in claim 1 wherein said wall panel means comprises a sheet-like member, first sealing means for effecting a weather seal between said sheet-like member and said roof, and second sealing means for effecting a weather seal between said sheet-like member and said bed.

5. A side loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, wall panel means, means for suspending said wall panel means from said roof for selectively enclosing said bed, said wall panel means comprising a sheet-like member, first sealing means for effecting a weather seal between said sheet-like member and said roof, second sealing means for effecting a weather seal between said sheet-like member and said bed, said first sealing means comprising a skirt depending from said roof proximate said sheet-like member, and said second sealing means comprising a flap attached to said bed proximate said side edges for providing a substantial lap joint with said sheet-like member.

6. A slide loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, selectively usable stabilizing means for selectively stabilizing said roof relative to said bed comprising a plurality of first flexible tie members extending between said roof and said bed, and second flexible tie members extending between said roof-supporting means and said bed.

7. A side loading truck body as set forth in claim 6 including mounting means on said roof for selectively mounting said first tie members in different positions relative to said bed.

8. A side loading truck body as set forth in claim 6 including wall panel means, and means for suspending said wall panel means from said roof for selectively enclosing said bed.

9. A side loading truck body as set forth in claim 6 wherein said roof-supporting means comprises a plurality of column means extending upwardly from said central portion of said bed, said column means including said lower portions and said upper portions.

10. A side loading truck body as set forth in claim 8 including means for anchoring said wall panel means relative to said side edge of said bed.

11. A side loading truck body as set forth in claim 10 wherein said wall panel means comprises a plurality of sheet-like panels, and means for selectively joining adjacent panels.

12. A side loading truck body as set forth in claim 11 wherein said wall panel means comprises a sheet-like member, first sealing means for effecting a weather seal between said sheet-like member and said roof, and second sealing means for effecting a weather seal between said sheet-like member and said bed.

13. A side loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, said roof-supporting means comprising a plurality of column means extending upwardly from said central portion of said bed, said column means including said lower portions and said upper portions said means for mounting said lower portions comprising an aperture in said bed for receiving each lower portion, and brace means underlying said bed attached to said lower portions.

14. A side loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, said roof-supporting means comprising a plurality of column means extending upwardly from said central portion of said bed, said column means including said lower portions and said upper portions, said roof-supporting means comprising an elongated section which includes said column means, said elongated section extending generally along the longitudinal axis of said bed, and said roof being supported substantially along its center on said elongated section.

15. A side loading truck body as set forth in claim 14 including selectively usable stabilizing means for selectively stabilizing said roof relative to said bed.

16. A side loading truck body as set forth in claim 15 wherein said stabilizing means comprises a plurality of flexible tie members extending between said roof and said bed.

17. A side loading truck body as set forth in claim 5 wherein said panel means comprise a plurality of panels, track means on the side of said roof, means in said track means for mounting the upper portion of said panels, means for anchoring said panels to said bed, and means for joining adjacent panels together for enclosing said bed.

18. A side loading truck body as set forth in claim 17 including stabilizing means for selectively stabilizing said roof relative to said bed, said stabilizing means including a plurality of flexible tie members extending between said roof and said bed, and wherein said roof supporting means comprises an elongated section which includes said column means, said elongated section extending generally along the longitudinal axis of said bed and wherein said roof is supported substantially along its center on said elongated section.

19. A side loading truck body comprising a truck bed including side edges bordering a central portion, roof-supporting means, lower portions on said roof-supporting means, means for mounting said lower portions of said roof-supporting means substantially on said central portion within the confines of said side edges to thereby leave said side edges substantially unobstructed to permit side loading onto said truck bed, upper portions on said roof-supporting means, a permanent roof, means securing said permanent roof to said upper portions of said roof-supporting means, selectively usable stabilizing means for selectively stabilizing said roof relative to said bed comprising a plurality of flexible tie members extending between said roof and said bed, mounting means on said roof for selectively mounting said tie members in different positions relative to said bed, said mounting means comprising track means mounted on said roof, carriage means movable in said track means, and means mounting said tie members on said carriage means.

References Cited

UNITED STATES PATENTS

| | | | |
|---|---|---|---|
| 2,986,424 | 5/1961 | Larsen | 296—100 |
| 3,066,974 | 12/1962 | Ambli | 296—100 |
| 3,231,305 | 1/1966 | Beckman | 296—100 |
| 3,310,338 | 3/1967 | Greenberg | 296—100 |
| 3,341,266 | 9/1967 | Schecter et al. | 312—11 |

KENNETH H. BETTS, *Primary Examiner.*

JOEL E. SIEGEL, *Assistant Examiner.*